Feb. 7, 1939.  E. G. KIMMICH ET AL  2,146,218
FLANGED HOSE
Filed Dec. 28, 1935   2 Sheets-Sheet 1
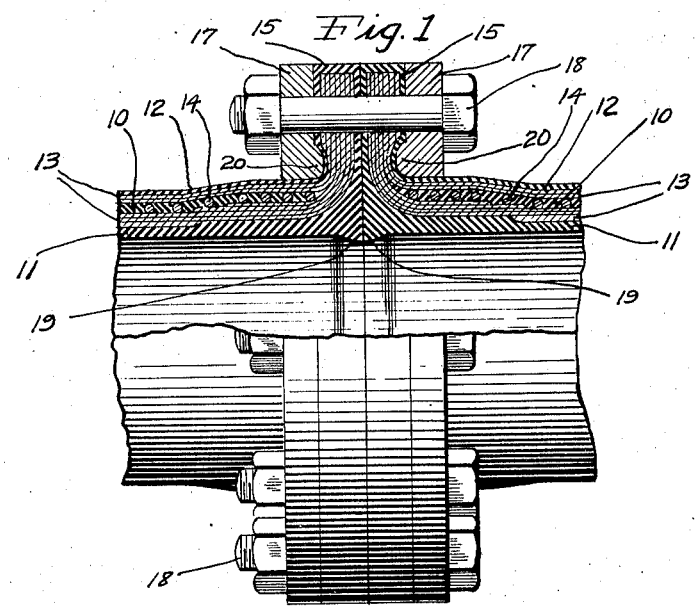
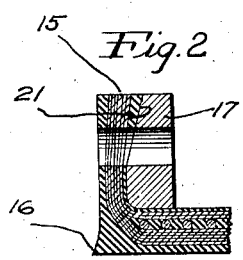 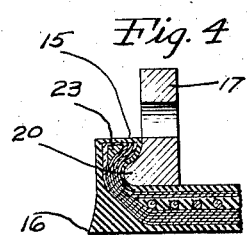 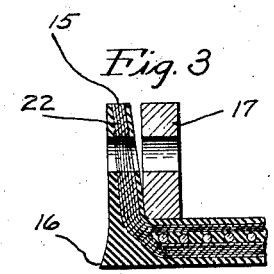
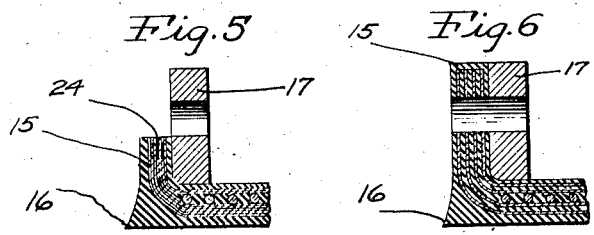
Inventor
Elmer G. Kimmich and
James L. Cutler
By
Attorney Feb. 7, 1939.  E. G. KIMMICH ET AL  2,146,218
FLANGED HOSE
Filed Dec. 28, 1935   2 Sheets-Sheet 2
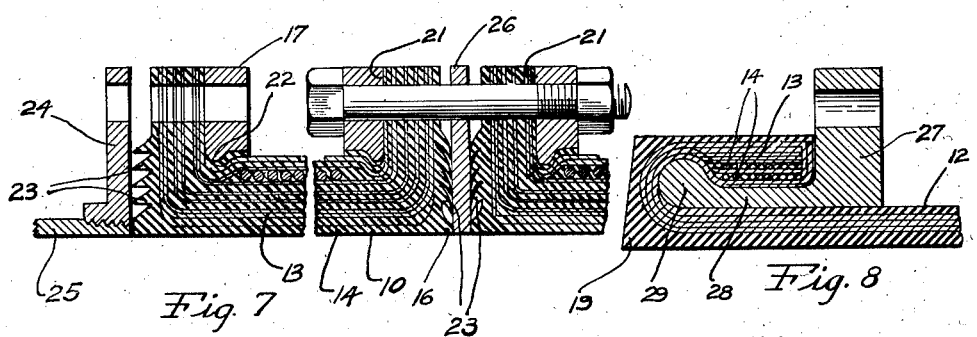
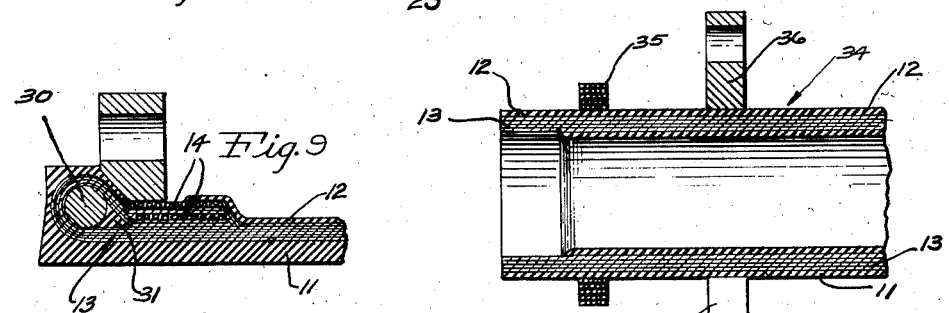
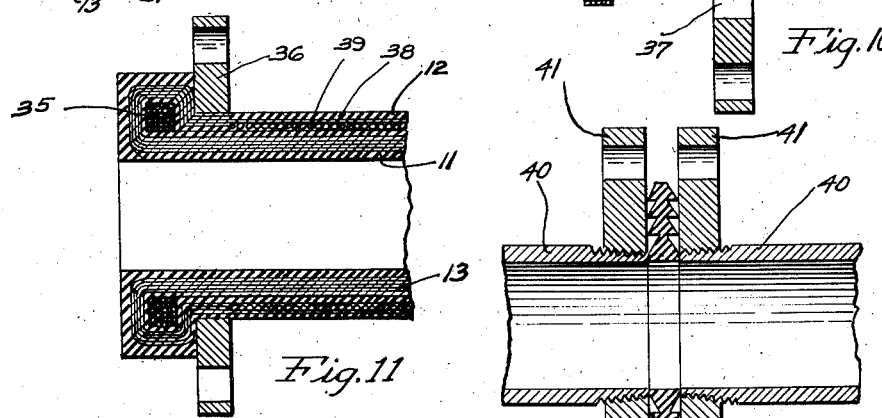
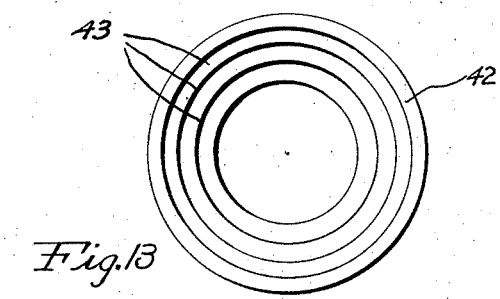
Inventor
Elmer G. Kimmich and
James L. Cutler
By
Attorney Patented Feb. 7, 1939

2,146,218

UNITED STATES PATENT OFFICE 2,146,218

FLANGED HOSE

Elmer G. Kimmich and James L. Cutler, Akron, Ohio, assignors to Wingfoot Corporation, Wilmington, Del., a corporation of Delaware Application December 28, 1935, Serial No. 56,554

1 Claim. (Cl. 285—71)

The present invention relates to flanged hose and it has particular relation to flexible rubber and fabric hose of the high-pressure type employed in connection with dredges, pumps, pipe lines and the like, or to hose reenforced by other means such as bead wire, etc.

It has been observed in hose now on the market that the inner surfaces at the ends of the lengths or sections flare apart circumferentially when the sections are secured together. This results in an internal annular recess at the junction of the sections which permits sand or other abrasive material passing through the hose to impinge upon the inner edges of the ends of the sections and cause undue wear at this point. This flaring of the inner surfaces of the sections of hose was caused by the fact that when the flanges at the ends of two adjacent sections were drawn together between the clamping rings, the pressure was concentrated circumferentially in a zone located outside of the clamping bolts, thus causing the material of the hose located inside of these bolts flowing inwardly under the clamping pressure and to form the annular recess above referred to.

One of the objects of this invention is to avoid the difficulties above referred to, by providing clamping rings which are so shaped as to concentrate the clamping pressure within a zone located close to the body of the hose and within the location of the clamping bolts.

Another object of the invention is to provide a hose of the character described, the ends of which are formed with an excess quantity of material adjacent to the inner circumferential surface of the hose, so that when the sections are bolted together this excess material will bulge inwardly whereby when pressure develops in the hose the excess material forms a smooth uniform bore at the joint substantially that of the remainder of the hose as the material pulls away from the joint.

Another object of this invention is to provide a flanged hose with annular rubber ribs on the end faces thereof to secure better clamping engagement with either a metal flange on an adjoining hose section or a metal plate arranged between two hose sections, both provided with similar recesses, all as will be hereinafter more specifically set forth.

Another object of this invention is to provide a substantially sleeve-shaped clamping flange for the end of a hose section about which the material is wrapped and secured in place by coiled wire and the like.

Another object of this invention is to provide means in which a solid ring is embedded in the end of the hose within the outer surface thereof toward which the clamping ring is drawn during the connecting of the hose sections to firmly clamp the material of the hose therebetween.

Another object of this invention is to provide a hose having a ring comprising coils of bead wire embedded in the end of the hose and a clamping ring for clamping the material of the hose between the ring of bead wire and the clamping member.

A still further object of this invention is to provide between the ends of adjacent hose or pipe sections a sealing means comprising a flexible member having continuous annular ribs projecting therefrom and deflatable out of their normal planes to prevent escape of the fluid from the hose or pipe sections.

With such objects in view, as well as other advantages which may be incident to the use of the improvements, the invention consists in the several parts and combinations thereof hereinafter set forth and claimed with the understanding that the several necessary elements constituting the same may be varied in proportions and arrangement without departing from the nature and scope of the invention as defined in the appended claim.

In order to make the invention more clearly understood there are shown in the accompanying drawings means for carrying the invention into practical effect, without limiting the improvements in their useful application to the particular constructions which, for the purpose of explanation, have been made the subject of illustration.

In the accompanying drawings:

Fig. 1 is a view partly in longitudinal section and partly in side elevation of the ends of two sections of hose embodying the present invention;

Fig. 2 is a fragmentary sectional view through a portion of the end of a hose constructed in accordance with another form of the invention;

Fig. 3 is a similar view illustrating another embodiment of the invention;

Fig. 4 is a similar view illustrating still another embodiment of the invention in which the flanged portion of the hose terminates within the zone of the clamping bolts;

Fig. 5 is a similar view illustrating still another form of the invention in which the flange portion of the hose terminates within the zone of the clamping bolts;

Fig. 6 is a view similar to Fig. 2 but in which both the flanged portion of the hose and the clamping ring are of uniform thickness;

Fig. 7 represents a hose construction in which the end faces are provided with annular ribs abutting against a metal flange or an annular metal ring arranged between two hose sections;

Fig. 8 shows a modification of our invention in which we employ a sleeve-type clamping ring about which the material is securely held;

Fig. 9 shows a modification of our invention in which a solid ring is embedded in the end of the hose section between which and the clamping flange the material is tightly compressed when the hose sections are coupled together.

Fig. 10 illustrates the manner of building a hose section similar to that in Fig. 9 but using a ring formed of bead wire instead of a solid non-contractible ring as in Fig. 9.

Fig. 11 is a longitudinal cross-section through a completed hose constructed according to Fig. 9; and Fig. 12 is a section through two metal pipes having metallic flanges thereon provided with an annular packing ring having laterally extending ribs on the outer surface thereof abutting against the metallic flanges on the pipe sections.

Fig. 13 is a plan view of the packing ring shown in Fig. 12.

Referring to the drawings and particularly to Fig. 1 thereof, a hose constructed in accordance with the present invention is shown as comprising a body portion 10 having inner and outer rubber linings 11 and 12 respectively and a plurality of interposed plies 13 of the rubberized fabric. A wire helix 14 may be incorporated in the body portion 10 between the plies 13 of fabric but terminates short of the ends of the hose. The ends of the hose are flared outwardly to form flanges 15 extending at right angles to the axis of the body portion 10 and these flanges may include additional plies of fabric if so desired. The outer faces of the flanges 15 are shaped as shown in Figs. 2 to 6 so as to provide a beveled rib 16 adjacent to the inner circumference of the hose. This particular shape may be obtained by molding during the fabrication of the hose or by cutting away the rubber after the hose is completed.

With reference again to Fig. 1, two sections of hose thus constructed are secured together with their flanges 15 in abutting relation by means of clamping members or rings 17 and bolts 18, which latter pass through the rings 17 and through the flanges 15 of the hose. The pressure developing when the sections are thus secured together tends to flatten the abutting faces of the flanges 15, thus causing the excess material of the ribs 16 to flow radially inwardly and form a circumferential internal bulge 19 at the line of junction between the two sections of hose. Thus, when pressure is developed in the hose, the bulge 19 disappears as the pressure in the sections tends to pull some of the rubber at the adjacent end, away from each other and the excess rubber fills in the gap which ordinarily will form in sections not provided with this excess material, thus leaving a uniform bore throughout the sections even at the joints therebetween.

The clamping members 17 may be vulcanized to the inner surfaces of the flanges 15 of the hose, and in the structure shown in Figs. 1 and 4 are each formed with a bead or rib 20 on the flange-engaging surface adjacent to the body 10 of the hose. This bead causes the material of the flange 15 to be compressed to a greater extent in a zone close to the body 10 of the hose and within the location of the bolts 18, than at points outwardly therefrom. This zone is located substantially midway the width of the flange 15 with the result that the material of the flange will flow in opposite directions substantially equal amounts when the sections of hose are clamped together, thus further minimizing any tendency for a gap to develop.

In the structure shown in Fig. 2 the clamping member 17 is formed with a beveled flange-engaging face 21 so as to relieve the pressure exerted by the clamping members around the outer circumference of the flange and to concentrate such pressure between the bolts 18 and the body 10 of the hose for the purpose just described.

In Fig. 3 a structure is illustrated which is a reversal of that shown in Fig. 2 in that the flange 15 of the hose, instead of the clamping member 17, is formed with a beveled surface 22, the member 17 being of uniform thickness. It will be obvious that when the member 17 in this instance is clamped against the flange 15 the material of the latter will be subjected to greater compression inwardly of the bolts 18 then adjacent the circumference of the flange.

In Figs. 4 and 5 there is illustrated a construction in which the flange 15 of the hose terminates within the location of the clamping bolts 18, thus insuring that the clamping pressure will be concentrated inwardly therefrom. In Fig. 4 the flange 15 is shown as being reenforced by a metal bead 23, whereas in Fig. 5 the flange 15 is reenforced by a plurality of spaced rings 24.

In Fig. 6 a still further modified form of the invention is illustrated. In this particular construction both the flange 15 and the clamping member 17 are of uniform thickness and the rib 16 of excess material alone relied upon to effect the desired initimate contact between the sections of hose.

In Fig. 7 of the drawings, we have shown in longitudinal cross-section portions of two sections of hose connected to each other and with one section connected to a pipe having a metal flange. The hose sections 21 are constructed quite similarly to the hose sections illustrated in Fig. 1, and similar reference characters are used to denote similar parts in these figures.

The nose portion 22 corresponds to nose portion 20 in Fig. 1 but extends inwardly toward the axis of the hose instead of parallel thereto. This increases the parallel clamping areas opposed to a similar area in an adjacent section without increasing the outside diameter of the clamping ring or member, whereby liquid is prevented from leaking out from between the hose sections as readily as in the construction such as shown in Fig. 1. The face of each hose section is provided with annular ribs 23 in addition to the single projecting rib 16. When not under compression these ribs have a cross-section similar to that illustrated at the left in Fig. 7, whereas under compression these ribs tend to fold in over each other as illustrated at the right in Fig. 7, whereby if there is a tendency for the hose sections to be pulled apart the ribs will still maintain their engagement either with the metal flange 24 on the pipe 25 or the metal disc 26 inserted between adjacent hose sections as shown at the right in Fig. 7. If any of the liquid passes the first or innermost annular rib, the second annular rib will tend to prevent the same from leaking out from between the ends of the hose sections and if the fluid between the first and second annular ribs is there under pressure, the pressure of the liquid will force the second rib more firmly against the sealing surface against which it abuts.

Similarly, the fourth, fifth and sixth flanges, etc., prevent a leak from occurring and are similarly pressed against the sealing surface, if any of the liquid reaches these ribs. Furthermore, as these hose sections wear internally, the ribs naturally will also wear, as will the plate 26, and successive sealing ribs will act to prevent leakage when the first set of ribs is destroyed.

In Fig. 8, we have illustrated a hose having one retaining flange 27 with an integral sleeve portion 28 enlarged as at 29 and about which the fabric of the hose is stretched, as illustrated clearly in this figure, the fabric being clamped around the sleeve portion 28 by means of the coiled wire 14. This prevents the fabric from being pulled around the enlarged end of the sleeve 28. When the clamping member 27 is drawn toward a similar clamping member on an adjacent hose section, the material at the end of the hose is clamped between similar enlarged portions 29 on the adjacent hose section and the portions 19 coact similarly to those shown in Fig. 1.

In Fig. 9, we have illustrated a hose section in which a rigid annular metal ring 30 is embedded in the end of the hose with the layers of fabric 13 brought up around the same and back along the end of the hose section where it is clamped by means of the coiled wire 14, the whole being enclosed within a layer of rubber similar to the other sections previously described. A filler 31 of rubber lies between the fabric just to the right of the ring 30. It is not necessary that this filler be used if the fabric is brought down closely around the ring 30, in which case the clamping flange 32, instead of having a tapered seat 33, as in Fig. 9, will preferably have a plain face similar to that on the member 17 in either Fig. 1 or Fig. 7. The clamping flange 32 is placed on the hose section before the enlarged end thereof is formed, as will be more apparent from the following description of Figs. 10 and 11.

Fig. 10 shows a step in the method of forming a modified form of the hose section shown in Fig. 9. A straight hose section is first built up as illustrated at 34 in Fig. 10 and an annular ring formed of spaced parallel coils of bead wire indicated at 35 is slipped over the end of the hose after the clamping member 36 has been slipped over the same. The clamping member 36 has an opening 37 of greater diameter than the outside diameter of the hose 34. The ends of the fabric and rubber layers 11, 12 and 13 are then brought up and over the outside of the ring 35 and stitched down to the outside of the hose section to the right of that ring, after which the clamping ring 36 is moved into the position illustrated in Fig. 11. Additional layers of rubber 38 and wire 39 may then be bound around the hose to the right of the clamping member 36 and the whole vulcanized to produce the section shown in Fig. 11. When two similar hose sections are fastened together by drawing the clamping flanges 36 toward each other, the material is clamped firmly between the flanges and the rings 35. Instead of forming the ring 35 before placing it on the hose 34, the same may be formed on the hose section by merely wrapping the bead wire thereabout.

In Figs. 12 and 13 we have shown two pipe sections 40 with flanges 41 adapted to be clamped together to connect the pipes. In order to provide proper sealing engagement similar to that secured in Fig. 7, an annular packing ring 42 is provided and this has spaced annular ribs 43 similar to the annular ribs 23 in Fig. 7. When the flanges 41 are drawn toward each other the ribs 43 are deflected the same as in Fig. 7 to effect the sealing of these flanges the same as in the construction shown in Fig. 7.

It is to be understood that, instead of or in conjunction with fabric reenforcement, bead wire arranged parallel to the hose length or peripherally thereof may be used and be made to conform to the functions and shapes given the fabric. Thus, strands of wire may be used in Fig. 9 or 11 to envelope the rings 30 or 35 respectively to prevent distortion of hose under high pressures.

Obviously, the sealing faces of the various hose sections shown in the drawings need not be exactly as shown in each of the figures of the drawings for it is within the scope of this invention that a hose section such as shown in Figs. 1 to 6 inclusive, and 8 to 11 inclusive, may be provided with a plurality of annular ribs, such as 23. Obviously, the sealing faces which are shown in the drawings and which are considered novel over prior-art structures, are preferable and give better results than other known types of sealing faces, but we do not wish to limit this invention except as may be hereinafter set forth in the claim.

From the foregoing, it will be apparent that a very efficient joint between two sections of hose is effected, and one in which the tendency for an internal circumferential gap or recess to develop when the sections are secured together is materially reduced.

Other modifications and changes in proportion and arrangement of the several necessary elements constituting the invention may be made by those skilled in the art without departing from the nature and scope of the invention as defined in the appended claim.

Having thus described the invention, what we claim and desire to secure by Letters Patent of the United States is:

A hose comprising a conduit portion formed of layers of rubber and reenforcing elements, a metal sleeve arranged about said conduit portion near the end thereof and closely embracing said conduit portion, the fabric and rubber of said hose having connecting portions arranged over and under the end of said sleeve, and means forming an integral portion of said hose for holding said layers firmly against the outer surface of said sleeve, said sleeve having an outwardly extending portion adapted to cooperate with suitable fastening means for clamping said hose in position.

ELMER G. KIMMICH.
JAMES L. CUTLER.